United States Patent
Martins et al.

(10) Patent No.: US 7,500,374 B2
(45) Date of Patent: Mar. 10, 2009

(54) APPARATUS FOR URGING AN OIL FILM BEARING ONTO AND OFF OF A ROLL NECK IN A ROLLING MILL

(75) Inventors: Armando S. Martins, Cumberland, RI (US); Timothy S. Dolan, Westminster, MA (US); Peter N. Osgood, Westborough, MA (US)

(73) Assignee: Morgan Construction Company, Worcester, MA (US)

( * ) Notice: Subject to any disclaimer, the term of this patent is extended or adjusted under 35 U.S.C. 154(b) by 170 days.

(21) Appl. No.: 11/695,640

(22) Filed: Apr. 3, 2007

(65) Prior Publication Data

US 2008/0244886 A1 Oct. 9, 2008

(51) Int. Cl.
*B21B 31/07* (2006.01)
(52) U.S. Cl. .......................................... 72/245; 72/237
(58) Field of Classification Search .................... 72/237, 72/238, 239, 245, 249, 252.5; 29/898.07, 29/898.08; 384/256, 556, 559, 561
See application file for complete search history.

(56) References Cited

U.S. PATENT DOCUMENTS

| | | | | |
|---|---|---|---|---|
| 2,243,009 A | * | 5/1941 | Howarth et al. ............... | 72/236 |
| 3,080,199 A | * | 3/1963 | Rickley ....................... | 384/584 |
| 3,627,388 A | * | 12/1971 | Jennings et al. ............... | 384/99 |
| 4,286,830 A | | 9/1981 | Salter, Jr. | |
| 6,132,101 A | * | 10/2000 | Landy, III .................... | 384/559 |
| 6,415,489 B1 | | 7/2002 | Martins et al. | |
| 6,892,562 B2 | * | 5/2005 | Gethings ..................... | 72/237 |
| 7,380,431 B2 | * | 6/2008 | Shriner et al. ................. | 72/245 |
| 7,386,939 B2 | * | 6/2008 | Di Giacomo ............. | 29/898.07 |

FOREIGN PATENT DOCUMENTS

| | | |
|---|---|---|
| EP | 1557226 | 7/2005 |
| JP | 08 024917 | 1/1996 |

\* cited by examiner

*Primary Examiner*—Edward Tolan
(74) *Attorney, Agent, or Firm*—Gauthier & Connors LLP

(57) ABSTRACT

An apparatus for urging an oil film bearing onto and off of a roll neck in a rolling mill comprises an annular hydraulically actuated piston/cylinder unit mounted on a cylindrical section of the roll neck. The cylindrical neck section is delimited at one end by a circular shoulder on the roll neck, and at the opposite end by a circular groove in the roll neck. A retaining ring has lock arms pivotally movable into seated positions in the groove. The piston/cylinder unit is operable in a first mode in an abutting relationship with the lock arms to urge the bearing onto the roll neck, and is operative in a second mode in an abutting relationship with the shoulder to urge the bearing off of the roll neck. The piston/cylinder unit and the lock arms having complimentary tapered surfaces arranged to coact in urging the lock arms inwardly into their seated positions in response to the abutment of the piston/cylinder unit with the lock arms.

2 Claims, 3 Drawing Sheets

APPARATUS FOR URGING AN OIL FILM BEARING ONTO AND OFF OF A ROLL NECK IN A ROLLING MILL

BACKGROUND DISCUSSION

1. Field of the Invention

This invention relates generally to rolling mill oil film bearings, and is concerned in particular with an improvement in the hydraulically actuated devices designed to urge the bearings onto and off of the roll necks.

2. Description of the Prior Art

In the conventional rolling mill oil film bearing, an annular hydraulically actuated piston/cylinder unit is employed to urge the bearing onto and off of the roll neck. The piston/cylinder unit is axially mounted on a cylindrical section of the roll neck and is confined at the inboard end by a shoulder on the roll neck and at the outboard end by a split retaining ring seated in a groove in the roll neck. The split retaining ring has a central bracket to which locking arms are connected by hinge pins. The locking arms are pivotally adjustable about the hinge pins between open positions removed from the neck groove, and closed positions seated in the groove.

Experience has shown that as the roll rotates during operation of the mill, a problem sometimes occurs due to failure of the hinge pins or the areas of the lock arms surrounding the hinge pins. When this occurs, centrifugal force causes the lock arms to be thrown outwardly, resulting in damage to the bearing and a disruption of the rolling process.

Efforts to overcome this problem have included the installation of separate safety cages designed to retain the lock arms in the event of failure of the hinge connections, and the introduction of larger clearances between the hinge pins and lock arms in an attempt at eliminating troublesome interferences. The safety cages disadvantageously add to the complexity and cost of the bearings, whereas increased clearances tend to make installation and removal of the retaining ring somewhat clumsy.

The object of the present invention is to provide an improved means for reliably retaining the lock arms in their closed positions.

SUMMARY OF THE INVENTION

In accordance with the present invention, an annular hydraulically actuated piston/cylinder unit is mounted on a cylindrical section of the roll neck. The cylindrical neck section is delimited at the inboard end by a circular shoulder on the roll neck, and at the outboard end by a circular groove in the roll neck. A retaining ring has lock arms pivotally movable into seated positions in the circular groove. The piston/cylinder unit is operable in a first mode in an abutting relationship with the lock arms to urge the bearing onto the roll neck, and is operable in a second mode in an abutting relationship with the circular neck shoulder to urge the bearing off of the roll neck. The piston/cylinder unit and the lock arms have complimentary tapered surfaces arranged to coact in urging the lock arms inwardly into their seated positions in the circular neck groove in response to the abutment of the piston/cylinder unit with the lock arms.

These and other features and attendant advantages of the present invention will now be described in further detail with reference to the accompanying drawings, wherein:

DETAILED DESCRIPTION

Figure 1:
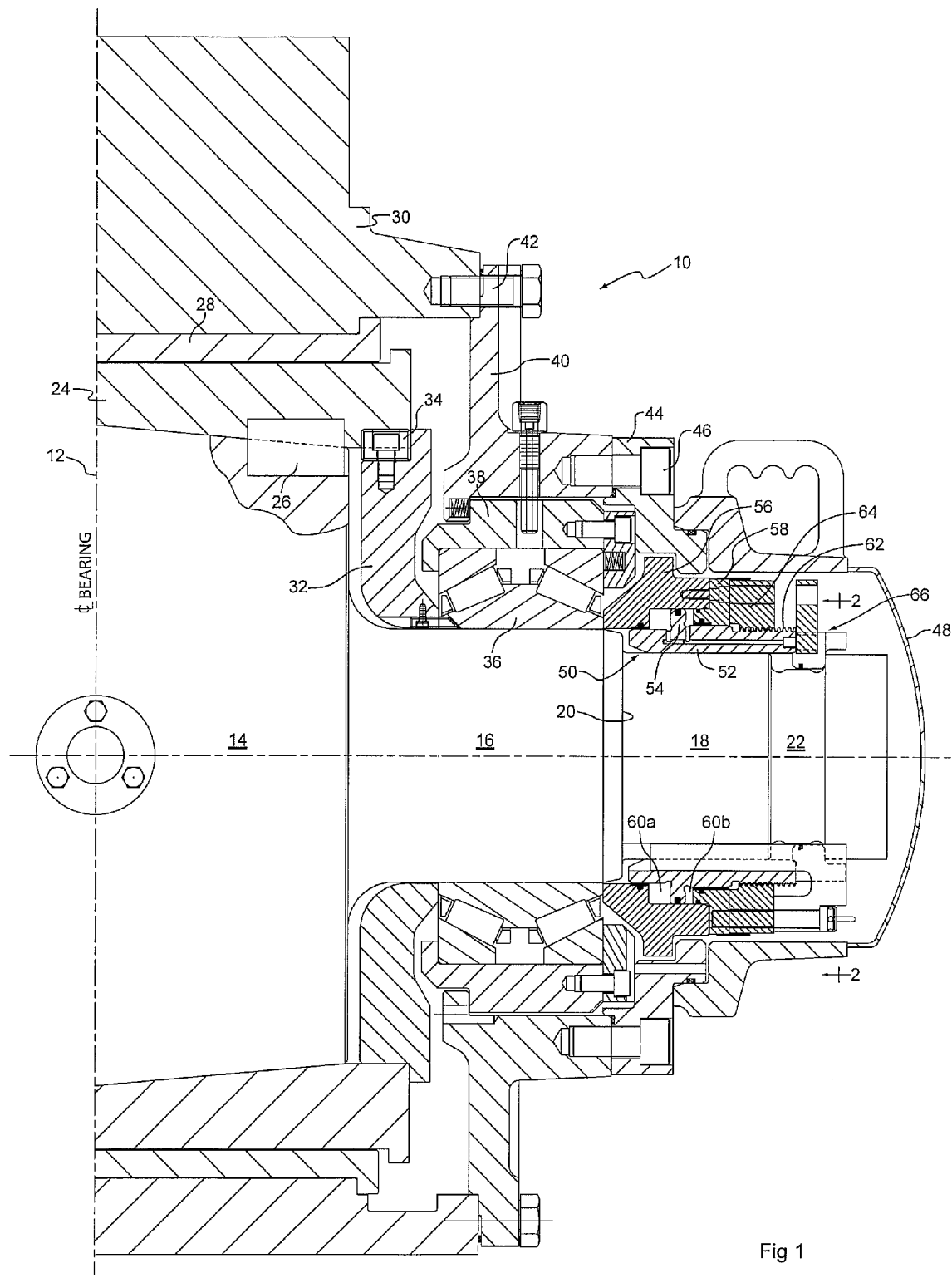
FIG. 1 is a longitudinal sectional view through a rolling mill oil film bearing incorporating a hydraulically actuated apparatus in accordance with the present invention.

With reference initially to FIG. 1, a rolling mill oil film bearing assembly is generally shown at 10 mounted on a roll neck 12. The roll neck includes a tapered section 14 merging with a cylindrical section 16 which in turn leads to a reduced diameter cylindrical outboard section 18 deliminated at the inboard end by a circular shoulder 20 on the roll neck and at the outboard end by a circular groove 22.

A sleeve 24 has a bore tapered to fit tightly on the tapered section 14 of the roll neck. The sleeve is keyed as at 26 to the roll neck, and is rotatably journalled in a bushing 28 contained within a chock 30. As is conventional with bearings of this type, a high pressure oil film is hydrodynamically maintained between the sleeve 24 and bushing 28 at the bearing load zone when the roll is in service.

A sleeve ring 32 is keyed to the sleeve 24 as at 34, and is abutted by the inner race of a thrust bearing 36. The thrust bearing is surrounded by a retainer 38 held by a collar 40 attached as at 42 to the chock 30. An end plate 44 is secured as at 46 to the collar 40, with the outboard end of the bearing being enclosed by a cover 48.

An annular piston/cylinder unit 50 is mounted on the cylindrical neck section 18. The piston/cylinder unit includes a piston 52 having a circular shoulder 54 cooperating with a surrounding cylinder 56 and cylinder end cap 58 to define first and second chambers 60a, 60b. The piston 52 has an externally threaded section 62 on which is screwed a lock nut 64. The piston 52, and hence the entire piston/cylinder unit 50 is axially confined on the cylindrical neck section 18 between the shoulder 20 on the roll neck and a retaining ring 66 seated in the groove 22.

When mounting the bearing on the roll neck, the piston/cylinder unit 50 is operational in a first mode in response to the introduction of pressurized hydraulic fluid into the first chamber 66a, and in an abutting relationship with the retaining ring 66 to urge the cylinder 56 to the left as viewed in FIG. 1. The cylinder thus acts via the thrust bearing 36 and sleeve ring 32 to urge the sleeve 24 and hence the entire bearing 10 into its seated position on the tapered roll neck section 14. The piston/cylinder unit 50 operates in a second mode in response to the introduction of pressurized hydraulic into the second chamber 60b and in abutting relationship with shoulder 20 to urge cylinder 56 in the opposite direction (to the right as viewed in FIG. 1). An outer circular shoulder on the cylinder thus engages the end plate 44, which acts through the collar 40 to pull the chock 30 along with the, bushing 28 and sleeve 24 off of the roll neck.

Figure 2:
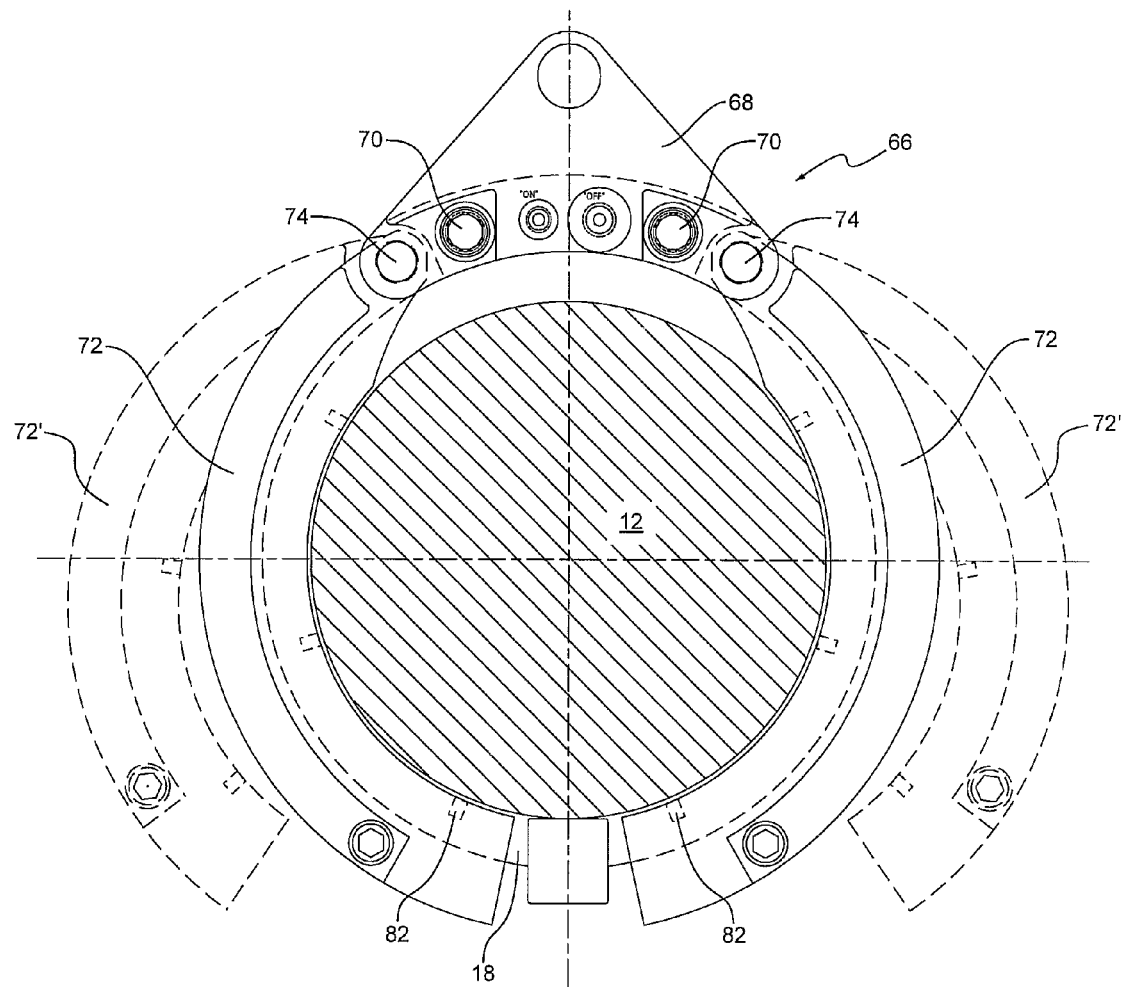
FIG. 2 is a partial cross sectional view on an enlarged scale taken along line 2-2 of FIG. 1.

As can best be seen in FIG. 2, the retaining ring 66 includes a central bracket 68 attached to the outboard end of piston 52 by bolts 70. Lock arms 72 are pivotally connected to the bracket 68 by hinge pins 74. The lock arms are adjustable between closed positions seated in the groove 18, as shown by the solid lines in FIG. 2, and open positions as shown at 72' by the broken lines.

Figure 3:
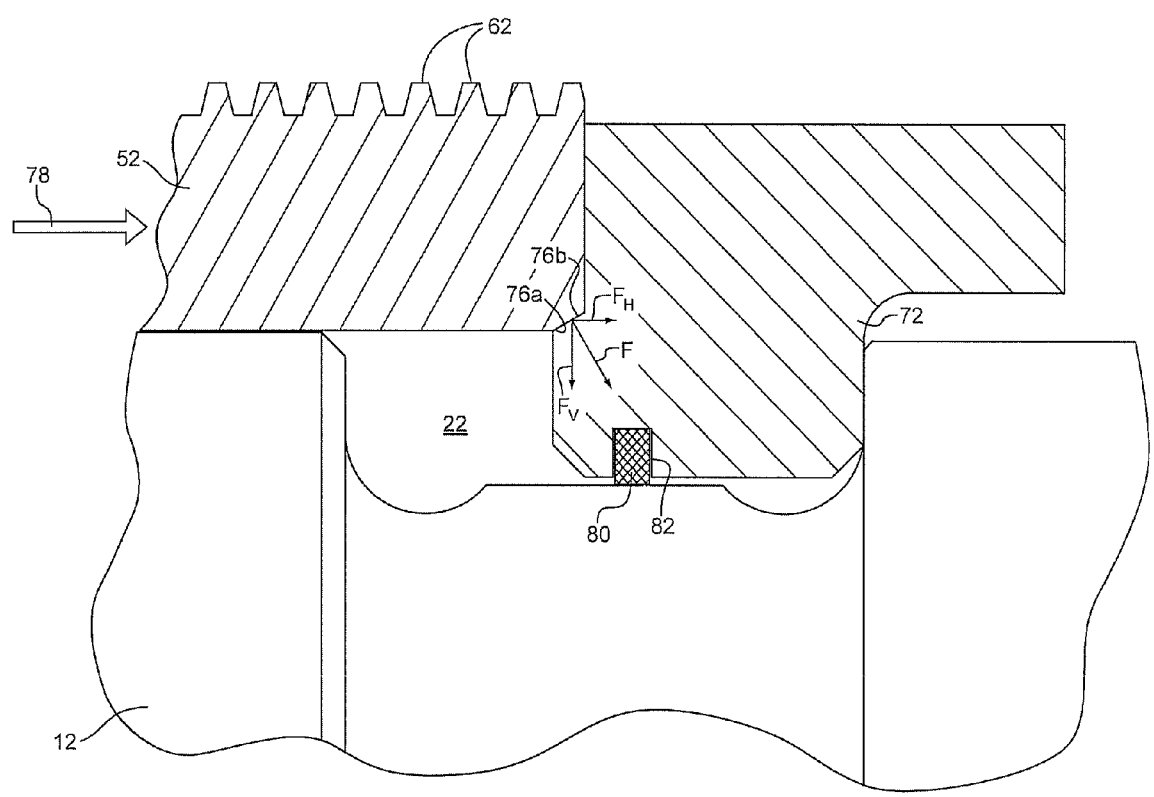
FIG. 3 is a partial longitudinal sectional view taken at approximately 90° from the sectional view of FIG. 1.

With reference additionally to FIG. 3, it will be seen that the outboard end of the piston 52 and the inboard sides of the lock arms 72 are provided, respectively, with complimentary tapered surfaces 76*a*, 76*b* arranged to abut at a common interface when the piston is urged in the direction of arrow 78, which occurs when the piston/cylinder unit is actuated in its first operational mode, as described previously.

Tapered surface 76*a* exerts a force "F" on tapered surface 76*b*. Force F may be resolved into a horizontal component $F_H$ and a vertical component $F_V$, the latter force serving to urge the lock arms 72 inwardly and to hold the lock arms in their seated positions in the groove 22.

Resiliently compressible rubber bumpers 80 are advantageously seated in holes 82 in the interior surfaces of the lock arms 72. The rubber bumpers are sized to provide an interference fit between the base of the groove 22 and lock arms 72 when the lock arms are urged inwardly by the resultant force component $F_V$.

In light of the foregoing, it now will be appreciated by those skilled in the art that the present invention provides a simple yet highly effective means of urging the lock arms 72 inwardly into securely seated positions in the neck groove 22. Thus, the prior art installation of encircling safety cages is no longer required. Nor is it necessary to consider providing increased clearances between the hinge pins and lock arms.

We claim:

1. Apparatus for urging an oil film bearing onto and off of a roll neck in a rolling mill, said apparatus comprising:

an annular hydraulically actuated piston/cylinder unit mounted on a cylindrical section of the roll neck, said cylindrical section being delimited at one end by a circular shoulder on the roll neck, and at the opposite end by a circular groove in the roll neck;

a retaining ring having lock arms pivotally movable into seated positions in said groove, said piston/cylinder unit being operable in a first mode in an abutting relationship with said lock arms to urge said bearing onto said roll neck, and being operative in a second mode in an abutting relationship with said shoulder to urge said bearing off of said roll neck; and said piston/cylinder unit and said lock arms having complimentary tapered surfaces arranged to coact in urging said lock arms inwardly into said seated positions in response to the abutment of said piston/cylinder unit with said lock arms.

2. The apparatus of claim 1 further comprising resiliently compressible means at the bottom of said groove, said resiliently compressible means acting in response to the inward urging of said lock arms by the coaction of said complimentary tapered surfaces to provide an interference fit between the base of said groove and said lock arms.

\* \* \* \* \*